H. B. LANE.
AUTOMATIC BELT SHIFTER.
APPLICATION FILED JULY 21, 1910.

1,001,053.

Patented Aug. 22, 1911.
2 SHEETS—SHEET 1.

Witnesses

Inventor
Herbert B. Lane
By Greeley & McIntire
Attorneys

H. B. LANE.
AUTOMATIC BELT SHIFTER.
APPLICATION FILED JULY 21, 1910.
1,001,053.
Patented Aug. 22, 1911.
2 SHEETS—SHEET 2.
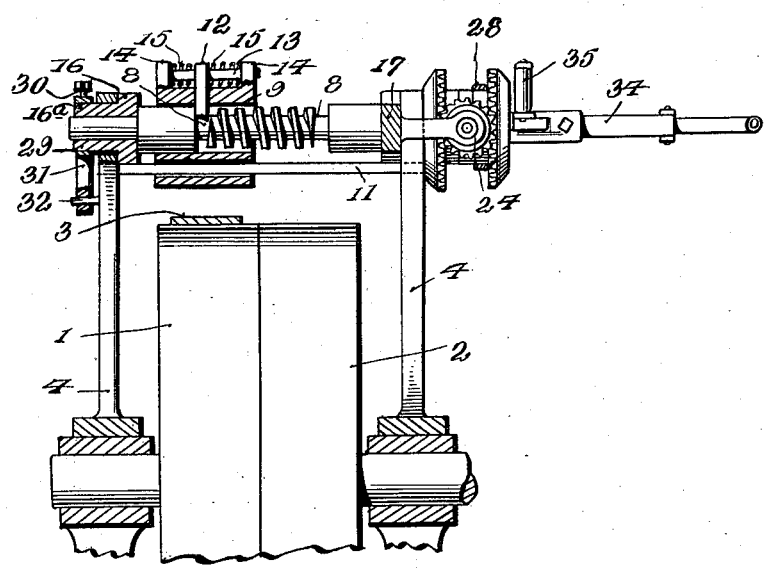
Fig. 3.
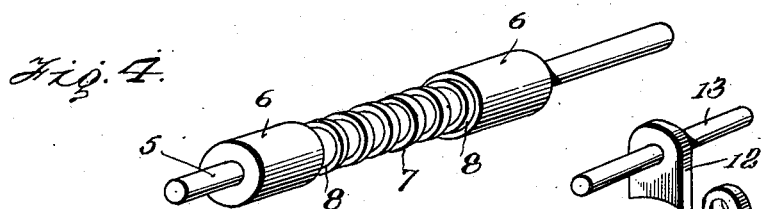
Fig. 4.
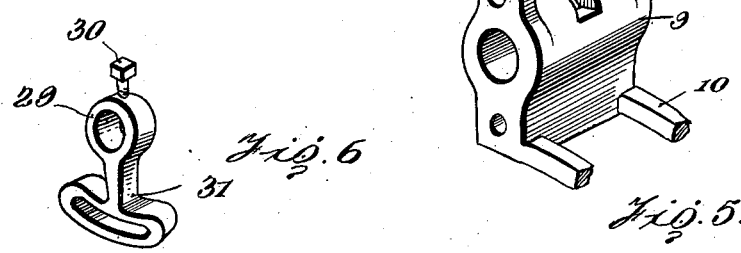
Fig. 6.
Fig. 5.
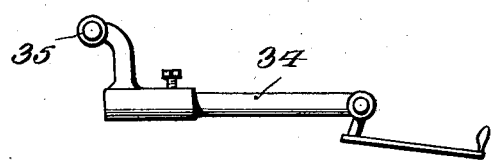
Fig. 7.
Witnesses
Inventor
Herbert B. Lane
By Greeley & McIntire
Attorneys

UNITED STATES PATENT OFFICE.

HERBERT B. LANE, OF LAURINBURG, NORTH CAROLINA, ASSIGNOR OF ONE-THIRD TO F. C. GRADDICK, OF ALBEMARLE, NORTH CAROLINA.

AUTOMATIC BELT-SHIFTER.

1,001,053.  Specification of Letters Patent.  Patented Aug. 22, 1911.

Application filed July 21, 1910. Serial No. 573,138.

*To all whom it may concern:*

Be it known that I, HERBERT B. LANE, a citizen of the United States, residing at Laurinburg, in the county of Scotland and State of North Carolina, have invented certain new and useful Improvements in Automatic Belt-Shifters; and I do hereby declare the following to be a full, clear, and exact description of the invention, such as will enable others skilled in the art to which it appertains to make and use the same.

The present invention relates in general to belt shifters, and more particularly to that type of belt shifters which are so designed as to be automatic in their operation.

The object of the invention is the provision of a belt shifter which is positive and reliable in its operation, which can be readily mounted in position, and which embodies novel features of construction whereby it will operate automatically to shift the belt as desired.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 1:
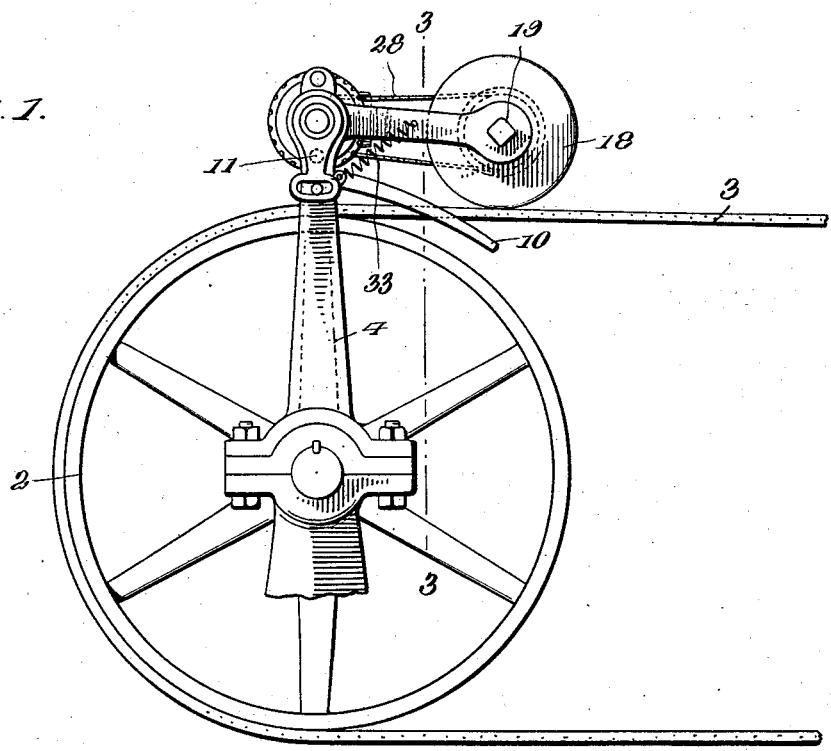
Figure 2:
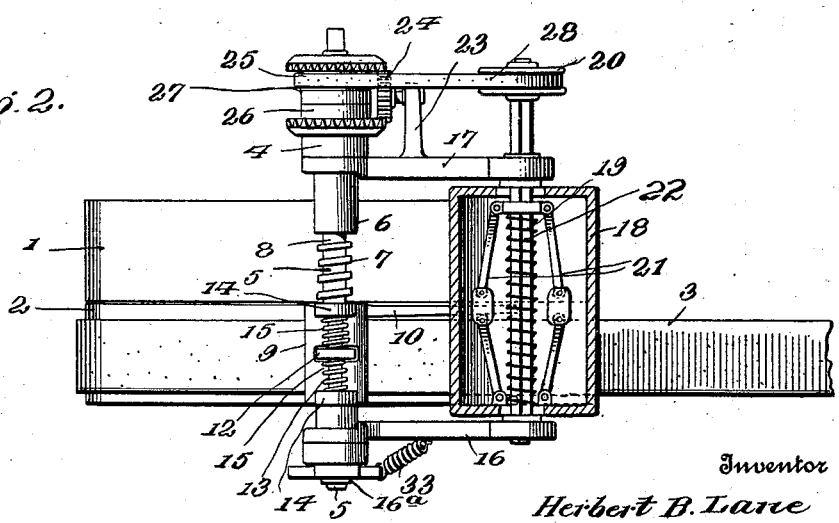

Figure 1 is a side elevation of a belt shifter constructed in accordance with the invention. Fig. 2 is a horizontal sectional view through the same. Fig. 3 is a sectional view on the line 3—3 of Fig. 1, and Figs. 4, 5, 6 and 7 are detail views of some of the parts.

Corresponding and like parts are referred to in the following description and indicated in all the views of the drawings by the same reference characters.

Referring to the drawings, the numerals 1 and 2 designate a pair of pulleys, and 3 a belt which extends around one of the pulleys and is designed to be shifted from one pulley to the other pulley as desired. A pair of brackets 4 project from the bearings of the pulleys 1 and 2 and extend slightly beyond the rims of the pulleys, a shaft 5 being journaled between the ends of the said brackets. This shaft is formed with a pair of enlarged portions or collars 6 and also with a worm or spiral projection 7 between the collars, the ends of the said worm terminating short of the collars to provide the free spaces 8. A tubular slide 9 is mounted upon the shaft 5 and is formed with a pair of belt shifting fingers 10 which extend upon opposite sides of the main belt 3 so that by moving the slide 9 upon the shaft 5 the main belt can be shifted upon the pulleys 1 and 2. The slide 9 is also formed with an opening which receives a guide rod 11 connecting the brackets 4 immediately under the shaft 5. This guide rod prevents the slide from rotating with the shaft 5, but enables it to move freely back and forth thereon. An opening is formed in one side of the tubular slide 9 to receive a block 12 which engages the worm 7, the two ends of the block being suitably beveled so as to readily enter the convolutions of the worm, as will be hereinafter fully described, when the direction of rotation of the shaft 5 is reversed. This block 12 is rigid with the middle portion of a rod 13 the ends of which pass loosely through suitable openings in the ears 14 projecting from the slide. Coil springs 15 which are applied to opposite ends of the rod 13 are interposed between the ears 14 and the block 12 and normally hold the said block in a yielding engagement with the adjacent end of the worm 7 when the block is moved to one end of the worm and is rotating in the free space 8 between the said end of the worm and the collar 6. As long as the shaft 5 continues to rotate in the same direction, the block 12 will remain in this free space 8, but should the direction of rotation of the shaft be reversed, the block 12 will enter the convolutions of the worm 7 and be carried thereby to the free space 8 at the opposite end of the worm. The slide 9 would be moved with the block and will operate through the medium of the fingers 10 to shift the belt 3.

A pair of arms 16 and 17 are pivotally connected to the outer ends of the brackets 4 so as to swing about an axis concentric with that of the shaft 5, and the governor cylinder 18 is journaled between these arms, the said governor cylinder being normally held in a yielding engagement with the main belt 3 so as to receive motion therefrom. An angular shaft 19 extends through the governor cylinder 18 and is slidably mounted therein, one end of the said shaft extending beyond the governor cylinder and having a pulley 20 rigidly applied thereto. Weighted governor members 21 are arranged within the cylinder 18 and have one end thereof connected to the cylinder while the opposite end is connected to the shaft 19. A spring 22 surrounds the shaft 19 and normally tends to move the said shaft so as to hold the pulley 20 at its outermost position away from the governor cylinder. However, should the speed of the main belt 3 become excessive, the centrifugal action of the weighted governor members 21 will operate in the usual manner to overcome the action of the spring 22 and draw the pulley 20 toward the governor cylinder 18.

The arm 17 is provided at an intermediate point in its length with a laterally projecting bearing 23 having an idler 24 journaled therein, the said idler being formed with teeth which mesh with toothed flanges upon pulleys 25 and 26 applied to one end of the shaft 5, the pulley 25 being rigid with the shaft while the pulley 26 is loose thereon. These two pulleys 25 and 26 must always revolve in opposite directions since the toothed flanges carried thereby mesh with opposite sides of the idler 24. A pulley 27 is loose upon the shaft 5 between the pulleys 25 and 26 so that the belt 28 which passes around the pulley 20 upon the angular shaft 19 will be moved upon the loose pulley 27 while being shifted from the pulley 25 to the pulley 26 or vice versa. When the governor cylinder 18 is not rotating with sufficient rapidity to bring the weighted members 21 into operation, the pulley 20 is held at the outward limit of its movement and the governor belt 28 engages the outer pulley 25. However, as soon as the weighted governor members 21 are brought into operation and draw the pulley 20 to the inward limit of its movement, the governor belt 28 is shifted from the pulley 25 to the pulley 26 and the direction of rotation of the shaft 5 thereby reversed. As previously described, this change in the rotation of the shaft 5 causes the slide 9 to be shifted to the opposite limit of its movement and to shift the main belt 3 upon the main pulleys 1 and 2.

The arm 16 is formed at its inner end with a pivot sleeve 16$^a$ which passes loosely through an opening in the corresponding bracket 4 and forms a bearing for one end of the shaft 5. A collar 29 is adjustably clamped upon the end of the pivot sleeve 16$^a$ by means of a set screw 30, the said collar being formed with an extension 31 having a segmental slot 32 therein which loosely receives a pin 32 upon the bracket 4. This pin serves to limit the swinging movement of the arm 16 in the event the main belt 3 should break. Springs 33 engage the extension 31 at the ends of the segmental slot 32 and serve to hold the governor cylinder 18 in a yielding engagement with the main belt. Should it be desired to shift the governor belt 28 by hand, a tubular handle 34 might be applied to the end of the shaft 5, the said tubular handle carrying a roller 35 adapted to engage the edge of the governor belt for shifting the same.

From the foregoing description, it will be obvious that the sliding movement of the angular shaft 19 caused by the spring 22 and the weighted governor members 21 will operate through the medium of the pulley 20 to shift the governor belt 28 and control the direction of rotation of the shaft 5 so as to automatically shift the main belt 3 as required.

Having thus described the invention, what I claim as new and desire to secure by Letters Patent, is:—

1. In a belt shifter, the combination of a shaft, means controlled by the direction of rotation of the shaft for shifting the belt, a governor cylinder mounted to swing about the shaft as an axis and engaging the belt, and means actuated by the governor cylinder for automatically controlling the direction of rotation of the shaft.

2. In a belt shifter, the combination of a shaft, means controlled by the direction of rotation of the shaft for shifting the belt, a governor cylinder mounted to swing about the shaft as an axis and engaging the belt, an angular shaft slidably mounted within the governor cylinder, means whereby the movements of the angular shaft are controlled by the speed of rotation of the governor cylinder, and means actuated by the shaft for controlling the direction of rotation of the first mentioned shaft.

3. In a belt shifter, the combination of a shaft, means controlled by the direction of rotation of the shaft for shifting the belt, a pair of pulleys upon the shaft, one of the pulleys being rigid with the shaft while the opposite pulley is loose thereon, gearing connecting the pulleys whereby they must turn in opposite directions, a governor cylinder mounted to swing about the shaft as an axis and normally engaging the belt, an angular shaft slidably mounted upon the governor cylinder, means whereby the sliding movement of the angular shaft is controlled by the speed of rotation of the governor cylinder, a pulley upon the angular shaft, and a governor belt passing around the said pulley and adapted to be shifted between the two pulleys upon the before mentioned shaft.

4. In a belt shifter, the combination of a shaft, means controlled by the direction of rotation of the shaft for shifting the belt, a pair of pulleys applied to the shaft and formed with toothed flanges, one of the pulleys being rigid with the shaft while the opposite pulley is loose thereon, an idler interposed between the toothed flanges of the pulleys for causing the pulleys to turn in opposite directions, a governor cylinder normally engaging the main belt and mounted to swing about the shaft as an axis, an angular shaft slidably mounted upon the governor cylinder, means whereby the sliding movements of the said angular shaft are controlled by the speed of rotation of the governor cylinder, a pulley rigid with the angular shaft, and a belt passing around the said pulley and adapted to be shifted between the pulleys upon the first mentioned shaft by the sliding movements of the angular shaft.

5. In a belt shifter, the combination of a shaft provided with a worm, a belt shifting slide mounted upon the shaft, a block carried by the slide and engaging the worm whereby the slide can be moved in either direction according to the direction of rotation of the shaft, a governor cylinder normally engaging the main belt and mounted to swing about the shaft as an axis, an angular shaft slidably mounted upon the governor cylinder, means controlled by the speed of rotation of the governor cylinder for sliding the angular shaft, a pulley rigid with the angular shaft, a pair of pulleys applied to the first mentioned shaft and formed with toothed flanges, one of the pulleys being rigid with the shaft while the opposite pulley is loose thereon, an idler interposed between the toothed flanges of the pulleys, and a governor belt extending around the pulley of the angular shaft and adapted to be shifted between the two pulleys upon the first mentioned shaft by the sliding movement of the angular shaft.

In testimony whereof I affix my signature in presence of two witnesses.

HERBERT B. LANE.

Witnesses:
C. L. SANFORD,
C. R. SANFORD.

---

Copies of this patent may be obtained for five cents each, by addressing the "Commissioner of Patents, Washington, D. C."